(12) United States Patent
Sato et al.

(10) Patent No.: US 6,930,708 B1
(45) Date of Patent: Aug. 16, 2005

(54) APPARATUS AND SYSTEM FOR CORRECTION BASED UPON DETECTING A CAMERA SHAKING

(75) Inventors: Yasuhiro Sato, Hadano (JP); Takashi Kitaguchi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/450,673

(22) Filed: Nov. 30, 1999

(30) Foreign Application Priority Data

Nov. 30, 1998 (JP) .......................................... 10-353791

(51) Int. Cl.$^7$ ........................ H04N 5/228; G03B 17/00; G03B 39/00

(52) U.S. Cl. .............................. 348/208.99; 348/208.2; 348/208.4; 348/208.5; 348/208.12; 348/208.15; 348/208.16; 369/52; 369/53; 369/54; 369/55; 369/13

(58) Field of Search ........................ 348/208.99, 208.2, 348/208.4, 208.5, 208.12, 208.15, 208.16; 396/52–55, 13

(56) References Cited

U.S. PATENT DOCUMENTS

| | | | | |
|---|---|---|---|---|
| 4,780,739 A | * | 10/1988 | Kawakami et al. ............ | 396/54 |
| 5,210,563 A | * | 5/1993 | Hamada et al. ................ | 396/53 |
| 5,227,889 A | * | 7/1993 | Yoneyama et al. ...... | 348/208.5 |
| 5,266,981 A | * | 11/1993 | Hamada et al. ................ | 396/55 |
| 5,416,558 A | * | 5/1995 | Katayama et al. ............. | 396/52 |
| 5,555,061 A | * | 9/1996 | Soshi et al. .................... | 396/53 |
| 5,585,875 A | * | 12/1996 | Imafuji et al. ................. | 396/55 |
| 5,623,305 A | * | 4/1997 | Ishizuka et al. .......... | 348/208.8 |
| 5,649,237 A | * | 7/1997 | Okazaki ....................... | 396/55 |
| 6,388,705 B1 | * | 5/2002 | Kawahara et al. ..... | 348/208.99 |
| 6,486,910 B1 | * | 11/2002 | Kaneda et al. ......... | 348/208.99 |
| 2002/0097324 A1 | * | 7/2002 | Onuki ......................... | 348/208 |

FOREIGN PATENT DOCUMENTS

| | | | | |
|---|---|---|---|---|
| JP | 1-223413 | 9/1989 | | |
| JP | 3-145880 | 6/1991 | | |
| JP | 4-37268 | 2/1992 | | |
| JP | 4-86730 | 3/1992 | | |
| JP | 4-95933 | 3/1992 | | |
| JP | 4-211230 | 8/1992 | | |
| JP | 6-332052 | 12/1994 | | |
| JP | 10-65975 | * 3/1998 | .......... | H04N/5/335 |

* cited by examiner

*Primary Examiner*—Wendy R. Garber
*Assistant Examiner*—James M. Hannett
(74) *Attorney, Agent, or Firm*—Oblon, Spivak, McClelland, Maier & Neustadt, P.C.

(57) ABSTRACT

A detecting system for detecting a deviation of a camera from shaking has at least two shaking detectors and one correcting device. The first shaking detector detects a camera shaking corresponding to one axis of a camera coordinate system. The second shaking detector detects a camera shaking corresponding to another axis of the camera coordinate system. The correcting device only adjusts a device corresponding to the first shaking detector in an optical system when a maximum or minimum value is detected on the output signal from the second shaking detector.

20 Claims, 14 Drawing Sheets

APPARATUS AND SYSTEM FOR CORRECTION BASED UPON DETECTING A CAMERA SHAKING

BACKGROUND OF THE INVENTION

1. Field of the Invention

This invention is generally related to an apparatus and a method for correction based upon detecting a deviation from a proper position of a camera, and more particularly is related to an apparatus for correcting deviation from the proper camera position caused by shaking, such as hand shaking.

2. Background of the Invention

Digital video cameras and digital still cameras, are kinds of cameras which are well known. When those kinds of cameras shoot a subject, the optical system of the camera brings rays of light corresponding to the subject to a focus at an image pickup device and changes the information of the light into the electric signals.

When the camera shaking occurs in the digital video camera, taken pictures slightly oscillate according to the camera shaking. Therefore, it is hard to watch the reproduced pictures of the digital video camera.

In the digital still camera, the camera can not realize the short exposure time because the sensitivity of the image pickup device is limited. The digital still camera goes out of focus when the camera shaking occurs.

Therefore, the pictures taken by the digital still camera become blurry.

Certain cameras have a function of correcting deviation caused by a slight oscillation based on a hand of an operator holding the camera shaking or by another cause for making the camera shake.

There are some methods for detecting a camera shaking, and such methods utilize devices such as angular velocity sensors, a piezoelectric gyro sensor, an acceleration sensor, and an optically detecting sensor. As another method for correcting a camera shaking, an image processing method is also known. The most popular method for addressing camera shaking utilizes a piezoelectric gyro sensor for detecting a rotary motion of the camera body.

Furthermore, detecting methods that utilize combinations of the above devices have been suggested.

When the camera is required to operate with extreme precision, the detecting system of the camera has to have six sensors and six actuators. The three sensors detect rotations around each three axes. The other three sensors detect parallel motions along each three axes. The actuators also adjust the optical devices such as the CCD or the lens according to the output of the sensors.

However, the present inventor has realized that if the camera includes the six sensors and the six actuators, the whole size of the camera is huge.

The direction of the camera shaking most susceptible to taking an image is a side-to-side motion that is called yawing and an up-and-down motion that is called pitching.

If the other camera shakings are ignored, the system absolutely needs two sensors and two actuators.

In this case, even if the camera is equipped with four devices, the size of the camera is still big.

SUMMARY OF THE INVENTION

Accordingly, one object of the present invention is to provide a novel system for correcting for any adverse influences generated by a camera shaking.

A more specific object of the present invention is to provide a novel system which overcomes the drawbacks in the background art as noted above.

To solve the above-noted and other problems, according to one aspect of the present invention, a detecting system for a deviation of a camera from shaking has at least two shaking detectors and one correcting device.

The first shaking detector detects a camera shaking corresponding to one axis of a camera coordinate system. The second shaking detector detects a camera shaking corresponding to another axis of the camera coordinate system. The correcting device only adjusts a device corresponding to the first shaking detector in an optical system when a maximum or minimum value is detected on the output signal from the second shaking detector.

DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
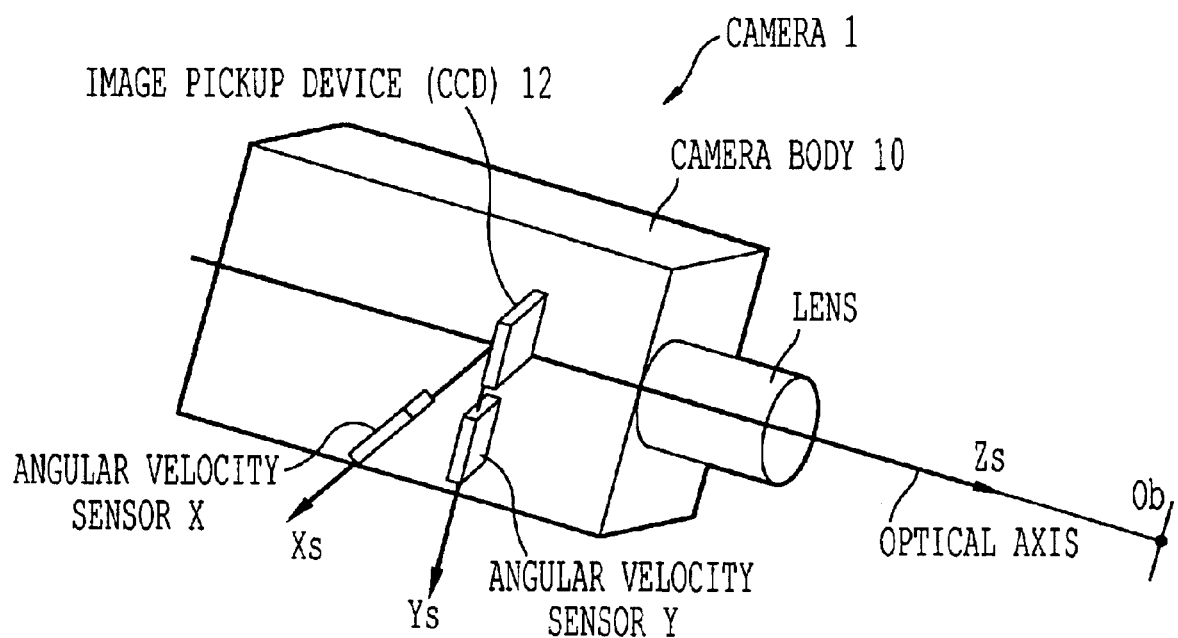
FIG. 1 is a conceptional model of a camera according to the present invention.

A description will now be given of preferred embodiments according to the present invention by referring now to the drawings, wherein like reference numerals designate identical or corresponding structures throughout the views.

FIG. 1 shows a conceptional view of a camera 1 with a correction mechanism for correcting of camera shaking according to the present invention.

The camera 1 includes a camera body 10 and a lens 11. An angular velocity sensor X, an angular velocity sensor Y, such as a piezoelectric gyro sensor and an image pickup device 12 are set up in the camera body 10. The essential structure of the camera according to the present invention has two sensors and an actuator for adjusting a position of the optical device according to signals detected by one of two sensors.

Figure 2A:
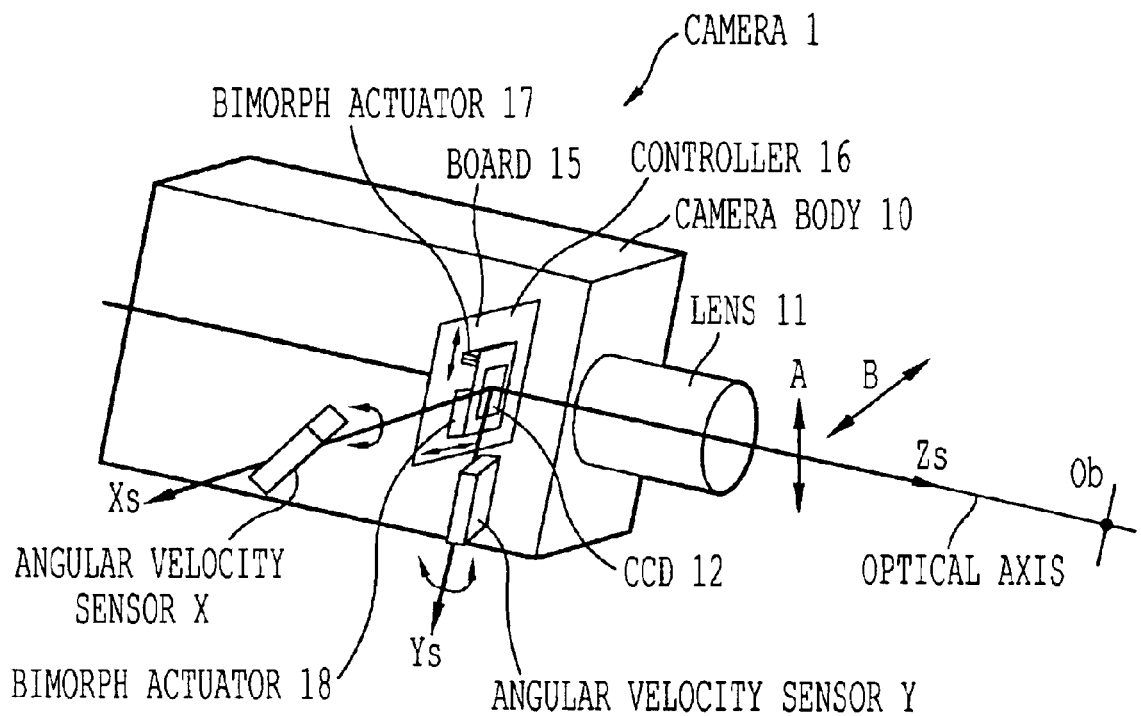
FIG. 2(a) is a perspective view of a camera according to a first embodiment of the present invention.
Figure 2B:
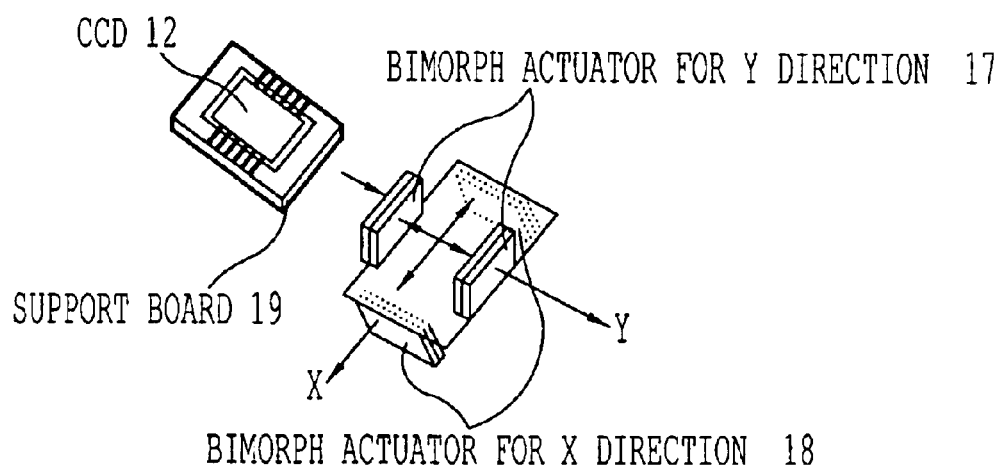
FIG. 2(b) shows a location between pairs of Bimorph actuators and a CCD device in the present invention.

FIGS. 2(a), 2(b) shows one preferred embodiment of a camera 1 with a correction mechanism for correcting for camera shaking according to the present invention.

The camera 1 includes a camera body 10 and a lens 11. An angular velocity sensor X, an angular velocity sensor Y, such as a piezoelectric gyro sensor and, an image pickup device 12 are set up in camera body 10. A board equipped with a controller supports the image pickup device 12. In this embodiment, the image pickup device 12 employs a 2-dimensional CCD.

The camera coordinate system is defined such that the direction of the optical axis is the Zs axis, the gravity direction is the Ys axis and the horizontal direction perpendicular to both the Zs axis and the Ys axis is the Xs axis. The angular velocity sensors X, Y are located on the Xs axis and Ys axis. In the above camera coordinate system, the point of origin is at a center of the imaging surface of the CCD 12.

When an operator holds the camera 1 at a general position, the YZ plane becomes a vertical plane against a horizontal plane, and the Xs axis becomes a horizontal direction.

The angular velocity sensor X is capable of detecting the camera shaking based on an up-and-down motion as shown in the direction of an arrow A in FIG. 2(a). The angular velocity sensor X detects the rotation around an axis in parallel with the Xs axis, which is called shaking in a pitching direction.

Similarly, the angular velocity sensor Y is capable of detecting the camera shaking based on a side-to-side motion as shown in the direction of an arrow B in FIG. 2(a). The angular velocity sensor Y detects the rotation around an axis in parallel with the Ys axis, which is called shaking in a yawing direction.

Therefore, the angular velocity sensors X and Y are capable of detecting the camera shaking corresponding to yawing and pitching direction.

According to FIG. 2(a), the angular velocity sensors X are shown outside of the camera body 10 for the sake of the explanation of the present embodiment. However, the real position of the above angular velocity sensors X, Y is in the camera body 10.

The board 15 is equipped with the CCD 12 via a support board and a pair of Bimorph actuators 17 and 18, and the controller 16. The Bimorph actuators 17, 18 actuate the position of the CCD 12 via the support board toward the XY direction each control of the controller 16.

Now referring to FIG. 2(b), the support board is equipped with a pair of Bimorph actuators 17 for the Y direction and a pair of Bimorph actuators 18 for the X direction. The CCD 12 is located on the top of the pairs of Bimorph actuators 17, 18 on an opposite side to the board 15. The position of the CCD device 12 is controlled based on the controller 16 equipped with the board 15. When the pair of Bimorph actuators 18 for the Y direction is driven, the CCD device 12 moves along the Ys direction. When the pair of Bimorph actuators 17 for the X direction is driven, the CCD device 12 moves along the Xs direction.

Figure 3:
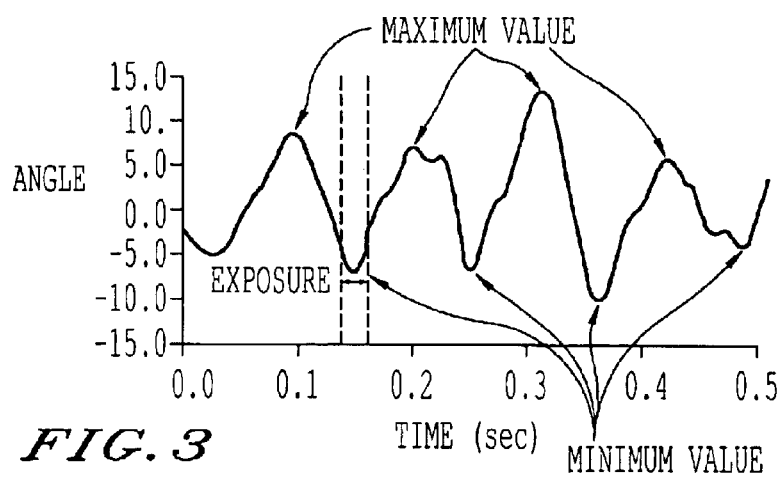
FIG. 3 is a spectrum of an angle detected by the angular velocity sensor in the present invention.

Now referring to FIG. 3, the signal of the angular velocity sensor X located on the Xs axis is described. The output signal of the sensor generally becomes a wave similar to a sinusoidal wave when the sensor detects the camera shaking.

In points of maximum value or points of minimum value in the signal, the angle regulation at those points is the smallest in the signal.

Therefore, the correction process and the shooting process are both carried out at the points of the maximum value or minimum value.

Figure 4A:
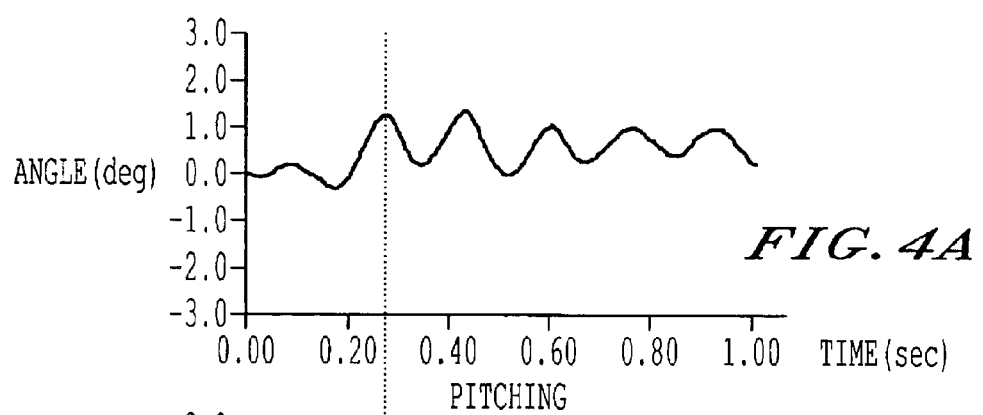
FIG. 4 is a relation between the spectrums of the angular velocity sensors in the present invention.
Figure 4B:
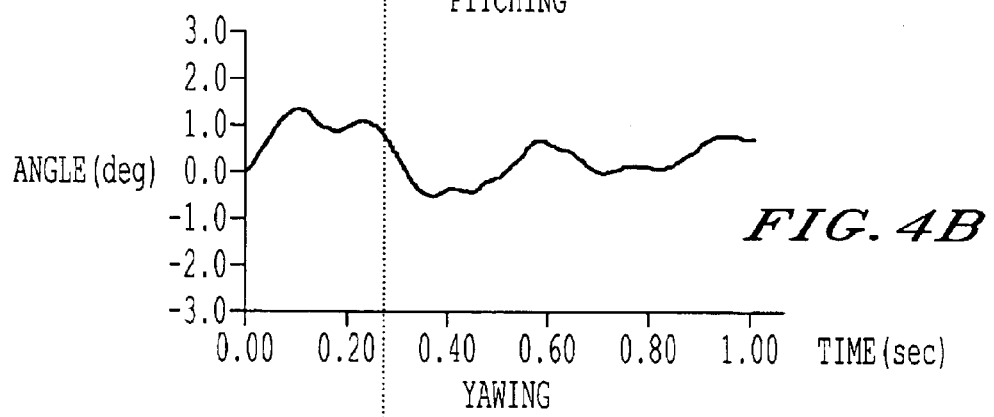
Figure 4C:
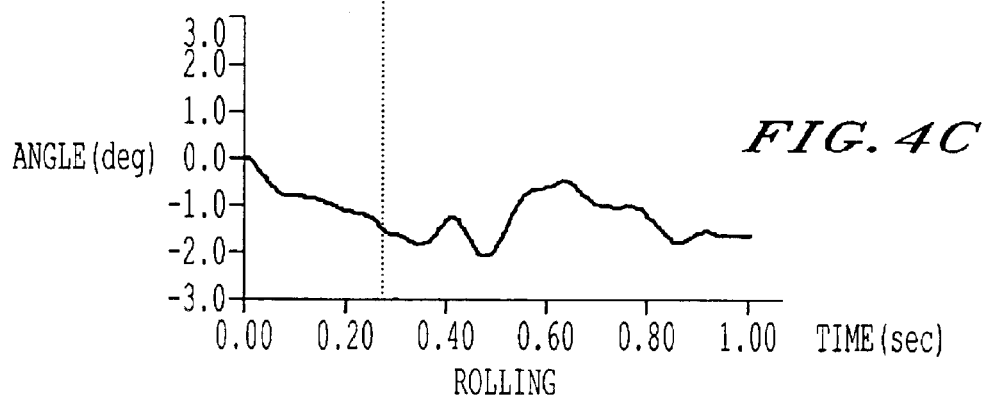

Now referring to FIG. 4, the signals of the angular velocity sensors are described. The signals from the angular velocity sensors do not synchronize.

In the above mentioned, the camera shakings based on the pitching direction and the yawing direction exert an influence upon the quality of the shooting image. The angular velocity sensor X is located on the Xs axis for sensing the camera shaking toward the pitching direction. The angular velocity sensor Y is also located on the Ys axis for sensing the camera shaking toward the yawing direction.

Therefore, when the system detects one of the camera shaking toward the yawing or pitching direction at the time corresponding to the point of maximum or minimum value, the system corrects only one camera shaking because the camera shaking in which exist the maximum or minimum value becomes a negligible amount. The system is equipped with only one actuator in order that the size of the camera is small.

Figure 5:
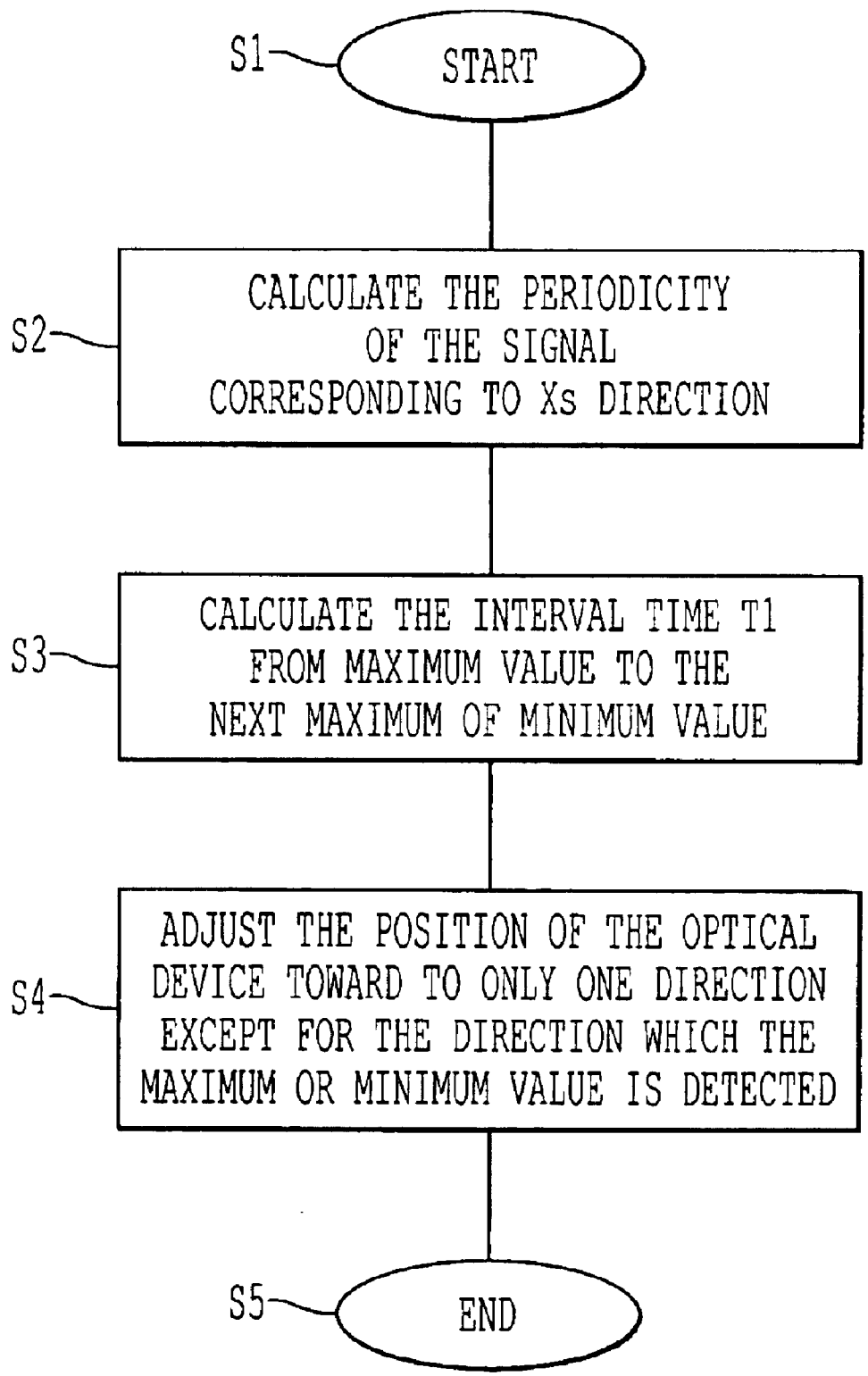
FIG. 5 is a flow chart for describing the present invention.

Now referring to FIG. 5, the correction process is described.

At first, the system starts to detect the camera shaking toward two directions of the axis when a user holds the camera at a step S1.

The process proceed to a step S2, in which the camera calculates the periodicity of the signal corresponding to the Xs direction.

The process proceeds to the next step S3. The system also calculates the interval time T1 corresponding to the time from the maximum value to the next maximum value or from the maximum value to the next minimum value based on the periodicity T at a step S3.

Finally, the process proceeds to next step S4. At the step S4, the system only adjusts the position of the optical device along the Ys axis corresponding to the yawing direction while close by the next minimum value or the next maximum value and carries out the shooting at that minimum value or that maximum value, after the angular velocity sensor X detects the maximum value.

The system of the present invention only has one actuator corresponding to the axis among the camera coordinate.

Therefore, the size of the camera is smaller than the one of the prior camera.

In the above embodiment, the angular velocity sensors are located on Xs and Ys axes. But, the angular velocity sensors are capable of locating Ys and Zs axes or Xs and Zs axes.

Figure 6A:
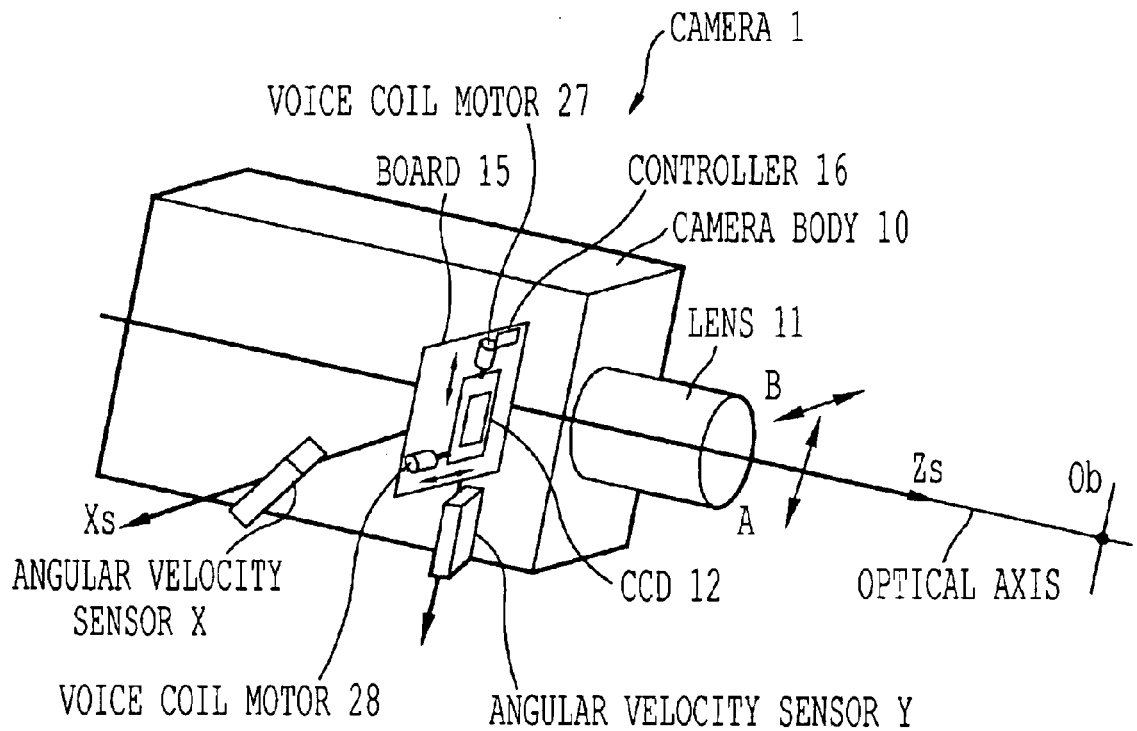
FIG. 6(a) is a perspective view of a camera according to a second embodiment of the present invention.
Figure 6B:
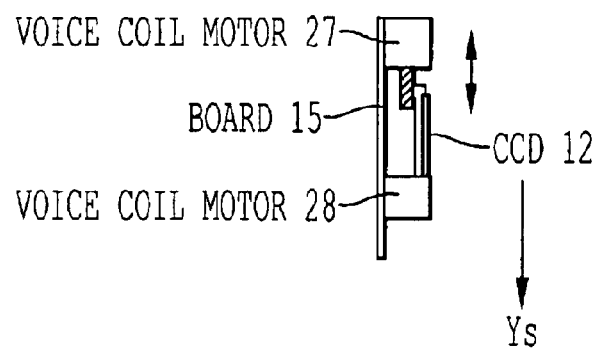
FIG. 6(b) is a cross-sectional view of an actuator for the CCD in the second embodiment of the present invention.

Now referring to FIGS. 6(a), 6(b), a second embodiment in which a pair of voice coil motors 27 is employed as actuators for driving the CCD 12 is described. A voice coil motor 27 is a driver for the position in the Ys direction of the CCD 12. The other voice coil motor 28 is a driver for the position in the Xs direction of the CCD 12. Both voice coil motors 27, 28 are attached with the support board 19 and adjust the position of the CCD 12 via the support board 19 under control of the controller 16 as shown 6(a). The other elements in 6(a), 6(b) are the same as in the first embodiment, and therefore a redundant explanation except to the pair of the voice coil motors 27, 28 has been omitted.

Figure 7:
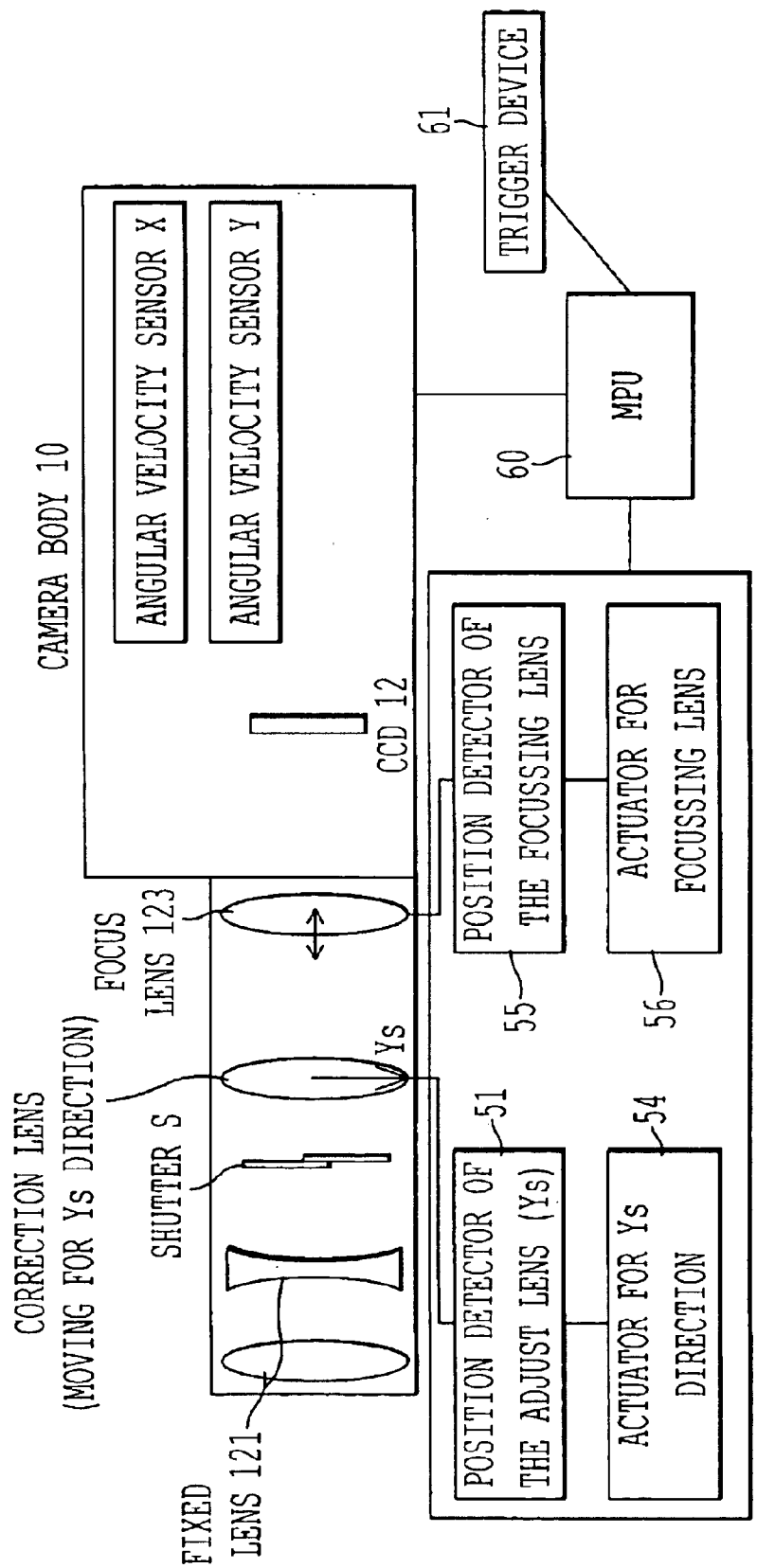
FIG. 7 is a block diagram for a total system in which a position of a correction lens is adjusted when camera shaking occurs according to a third embodiment of the present invention.

Now referring to FIG. 7, a third embodiment is described. In this embodiment, the actuator for CCD 12 does not exist. Therefore, the position of the CCD 12 is fixed.

When the MPU 60 receives the trigger signals from the trigger device 61, the angular velocity sensors X, Y start to detect the angular velocity by the camera shaking under control the MPU 60. The lens 11 may be formed of a fixed lens 121, a shutter S, a correction lens 122, and a focus lens 123. The focus lens 123 is held in the lens 11, and can move toward the optical axis. After an actuator 56 moves the focus lens 123 along the optical axis, a position detector 55 detects the position of the focus lens 123 on the optical axis. The detected position data of the focus lens 123 is forwarded to the MPU 60. The MPU 60 then controls the position of the focus lens 123 according to control programs.

The correction lens 122 is a lens for adjustment of the camera shaking and is capable of moving toward the direction of the Ys axis. An actuator 54 moves the correction lens 122 under control the MPU 60. The position detectors 51 can detect the position of the correction lens 122 after adjustment.

The actuator 54 and position detectors 51 are a part of a mechanical potion for the correction of the camera shaking. The MPU 60 is a part of the controller 16. The controller 16 controls the actuators 54, 56 according to the angular velocity detected by the angular velocity sensors X and Y and position information of position detector 51.

A trigger device 61, such as a shutter release button, generates a trigger signal when the shutter release button is pushed to a halfway position. When the trigger signal is generated, the controller inputs electric power into the angular velocity sensors and the drivers of the actuators.

The angular velocity sensors and the drivers only require the electric power during taking a shot. Therefore, the electric power supply controlled according to the trigger signal avoids electric power loss.

The above embodiment is also capable of employing a magnetostriction device or an ultrasound motor, as other examples.

Figure 8:
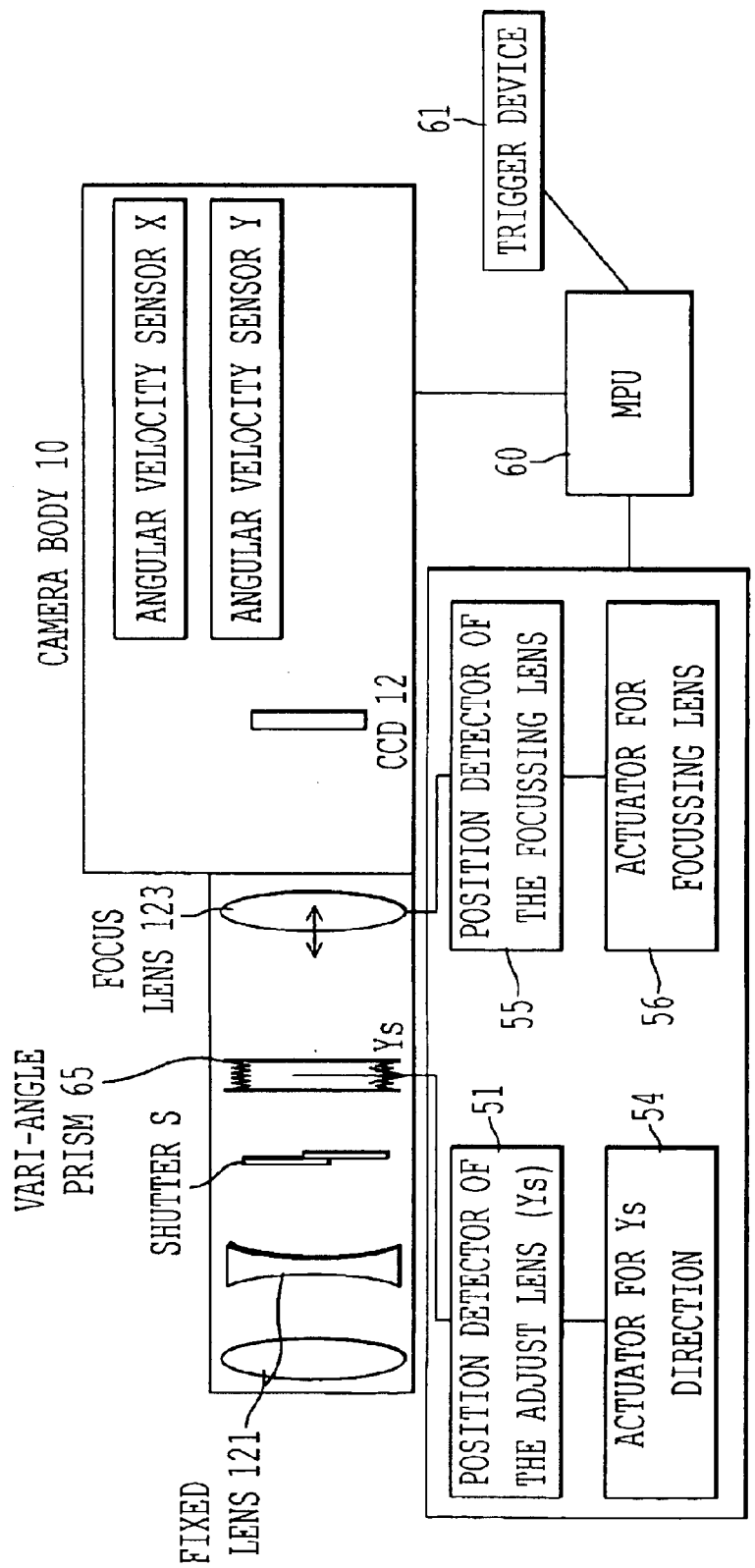
FIG. 8 is a block diagram for a total system in which a position of a correction lens is adjusted by a Vari-angle prism and a position of a CCD device is adjusted when camera shaking occurs according to a fourth embodiment of the present invention.

Now referring to FIG. 8, in a fourth embodiment, the camera substitutes for the correction lens 122 a Vari-angle prism 65.

Figure 9A:
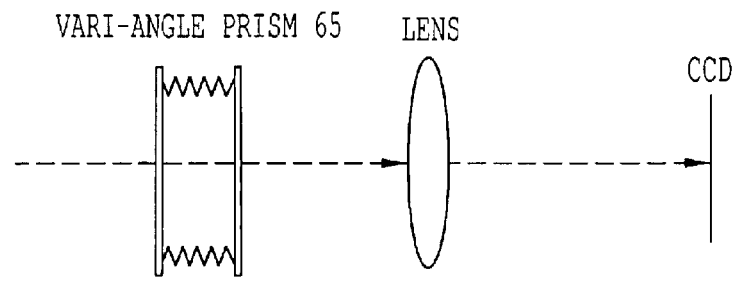
FIG. 9(a) is a cross-sectional view of an optical system in which a Vail-angle prism is employed when camera shaking does not occur.
Figure 9B:
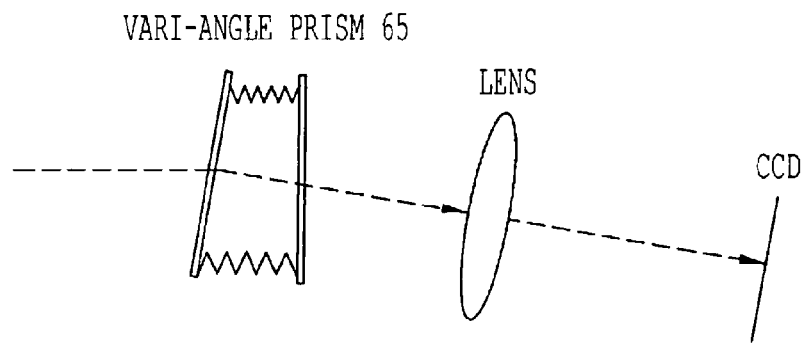
FIG. 9(b) is a cross-sectional view of an optical system in which a Vari-angle prism is employed when camera shaking does occur.

A vari-angle prism 65 is located in the optical system on the optical axis. The vari-angle prism can control a variable rotation angle as shown in FIGS. 9(a) and 9(b). The structure of the vari-angle prism 65 may be that of two optically transparent boards connected with an accordion device and to sandwich a liquid with a high refractive index with the transparent boards. The controller controls the variable rotation angle of the prism 65 according to the camera shaking. One example of details of an explanation of the Vari-angle prism can be found in WWW site URL "http://www.usa.canon.com/indtech/broadcasteq/vaplens.html", the contents of this reference being incorporated herein by reference.

Still referring to FIG. 9(a), when the camera shaking does not occur, the variable rotation angle equals zero. When the camera shaking does occur, the variable rotation angle is controlled according to the detected angular velocity, and a calculated angular velocity and angle under control of the controller as shown FIG. 9(b).

The other elements in FIG. 8 are the same as in the third embodiment, and therefore a redundant explanation has been omitted.

Figure 10:
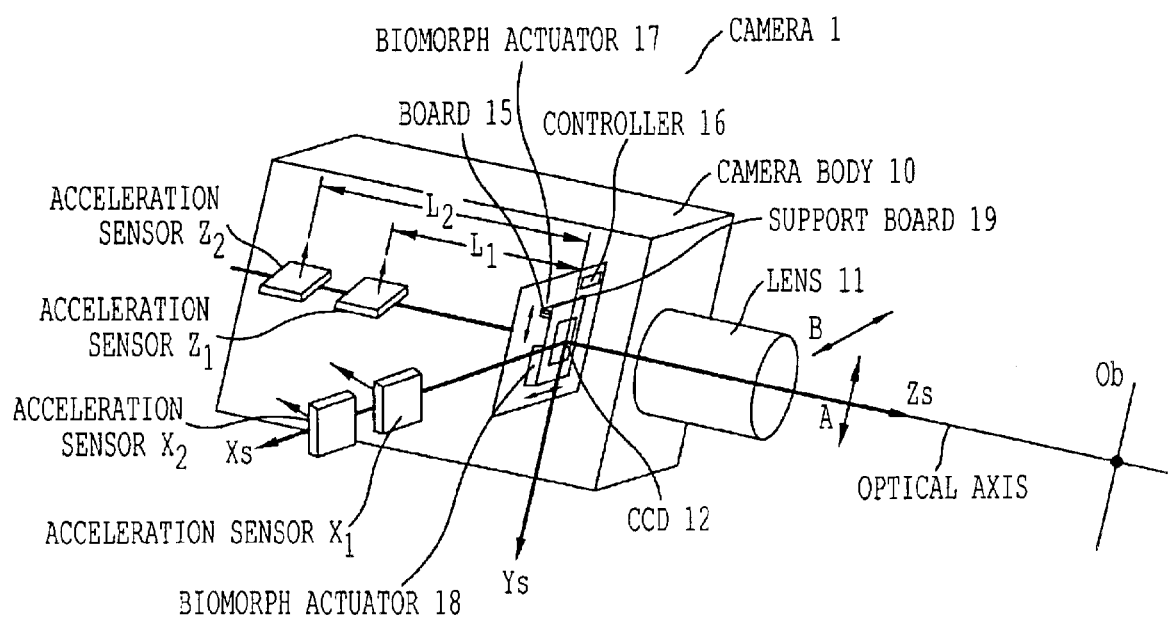
FIG. 10 is a perspective view of a camera according to a fifth embodiment of the present invention.

Now referring to FIG. 10, another embodiment of the angular velocity sensors in the camera 1 with the correction mechanism is described. The camera according to the fifth embodiment has two pairs of acceleration sensors on each axis of the camera coordinate instead of the piezoelectric gyro sensor in the first embodiment.

A pair of acceleration sensors X1, -X2, and a pair of acceleration sensors Z1, Z2 are located on respective Xs, Zs axes. The camera 1 includes a camera body 10 and a lens 11. The pair of acceleration sensors X1, X2, the pair of acceleration sensors Z1, Z2, an image pickup device 12 such as a CCD, a board 15 equipped with a controller 16, and actuators 17, 18 are set up in the camera body 10. The CCD 12 is supported on a support board 19 located on the board 15 via Bimorph actuators 17 and 18. The camera 1 brings into focus a target object in which is located an object position (Ob). The image corresponding to the target object is in focus at an imaging surface of the CCD 12 by lens 11.

The pair of acceleration sensors Z1, Z2 is located on the optical axis. The camera coordinate system is defined such that the direction of the optical axis is the Zs axis, the gravity direction is the Ys axis, and the horizontal direction perpendicular to both the Zs axis and the Ys axis is the Xs axis. In the above camera coordinate system, the point of origin is at a center of the imaging surface of the CCD 12.

When an operator holds the camera 1 at a general position, the YZ plane becomes a vertical plane against a horizontal plane, and the Xs axis becomes a horizontal direction.

The pair of acceleration sensors Z1, Z2 is capable of detecting an up-and-down motion based on the camera shaking, which is called shaking in a pitching direction as shown in the direction of an arrow A in FIG. 10. The pair of the acceleration sensors Z1, Z2 is located apart from each other at a predetermined distance in the optical direction. The pair of accelerator sensors Z1, Z2 detects the rotation around an axis in parallel with the Xs axis.

Similarly, the pair of acceleration sensors X1, X2 is capable of detecting a side-to-side motion based on the camera shaking, which is called shaking in a yawing direction as shown in the direction of an arrow B in FIG. 10. The pair of the acceleration sensors X1, X2 is located apart from each other at a predetermined distance in the Xs direction. The pair of acceleration sensors X1, X2 detects the rotation around an axis in parallel with the Ys axis.

Therefore, the two pairs of acceleration sensors X1, X2 and Z1, Z2 are capable of detecting the camera shaking corresponding to yawing and pitching which are susceptible to taking an image.

The system is also capable of employing two sets of the acceleration sensors X1, X2 and Y1, Y2 or two sets of the acceleration sensors Z1, Z2 and Y1, Y2.

In those cases, the pair of the acceleration sensors Y1, Y2 is located apart from each other at a predetermined distance in the Ys direction.

Still referring to FIG. 10, the pair of acceleration sensors X1, X2 is shown outside of the camera body 10 for the sake of the explanation of the present embodiment. However, the real position of the above pairs of acceleration sensors X1, X2 and Z1, Z2 is in the camera body 10.

The support board 19 is equipped with a pair of Bimorph actuators 17 for the Y direction and a pair of Bimorph actuators 18 for the X direction, as in the first embodiment.

Figure 11:
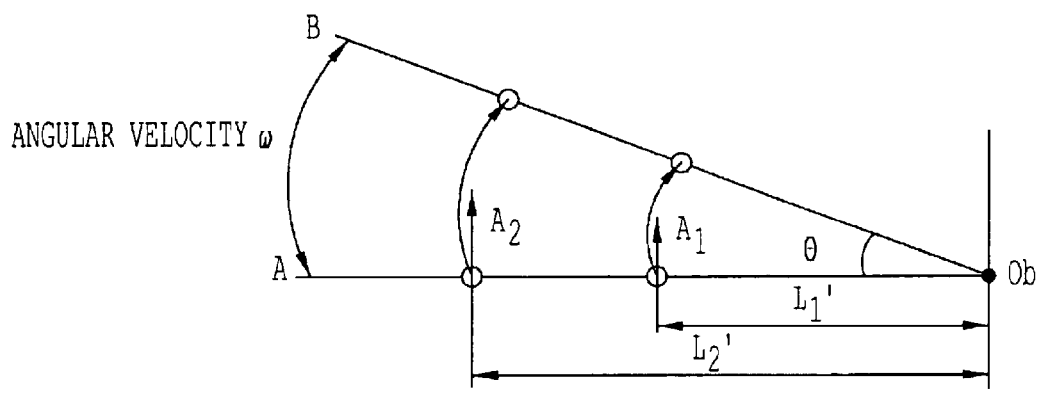
FIG. 11 is a cross-sectional view of a relation between outputs of acceleration sensors and a rotation angle according to the fifth embodiment.

Now referring to FIG. 11, the pair of acceleration sensors Z1, Z2 detects the camera shaking in the pitching direction according to the camera shaking.

FIG. 11 shows a drawing of a cross-section of the YZ plane.

When the camera body 10 is inclined at an angle θ toward Ob in the YZ plane as a result of up-and-down motion of the camera, the output of the acceleration sensor Z1 is acceleration A1 at a distance L1' from Ob, and the output of the acceleration sensor Z2 is acceleration A2 at a distance L2 from Ob. The accelerations A1 and A2 are described in the following equations (1), (2). In the equations (1), (2), ω is rotation angular velocity, and t is time.

$$A1 = L'_1 \left( \frac{d\omega}{dt} \right) \quad (1)$$

$$A2 = L'_2 \left( \frac{d\omega}{dt} \right) \quad (2)$$

When equation (1) is subtracted from equation (2).

$$A2 - A1 = \left( \frac{d\omega}{dt} \right) (L'_2 - L'_1) \quad (3)$$

The distance (L2'-L1') equals the distance between the position of the acceleration sensor Z1 and the position of the acceleration sensor Z2, (L2-L1). The distance (L2-L1) is a predetermined unique value for each camera. Further, the subtraction of the accelerations (A2-A1) can be calculated based upon the output of the pair of the acceleration sensors Z1, Z2. Therefore, the angular acceleration (dω/dt) can be obtained from the above equations (1), (2), (3).

Proceeding to a next step, before the exposure is carried out, a position of the camera 1 is defined as an initial position and an initial time is defined as t=0 at the initial position. During exposure, the angular acceleration (dω)/dt) is integrated with respect to t between every time interval, which are divided plural time sectors from t=0 to the total exposure time period. The angular velocity ω and the rotation angle θ is then calculated.

A camera shaking by rotation around an axis in parallel with the Ys axis based on the side-to-side motion of the camera is similarly calculated based upon the output of the pair of acceleration sensors X1, X2.

Figure 12:
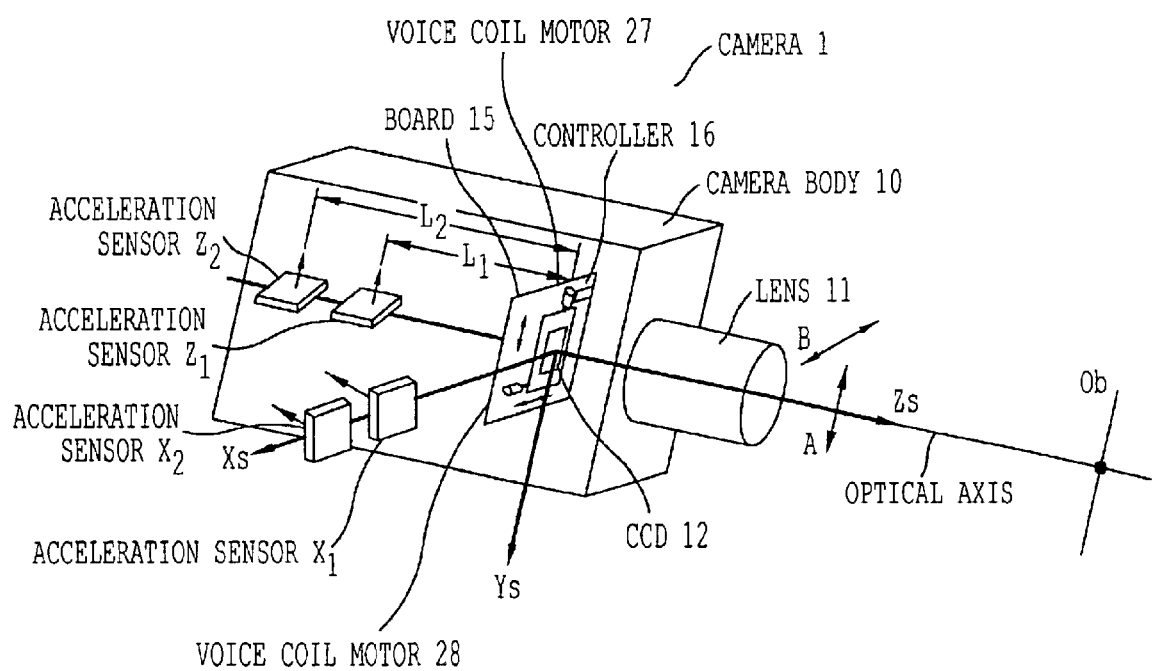
FIG. 12 is a perspective view of a camera according to a sixth embodiment of the present invention.

Now referring to FIG. 12, a sixth embodiment in which a pair of voice coil motors 27 is employed as actuators for driving the CCD 12 is described and is similar to the second embodiment. The other elements in FIG. 12 are the same as in the fifth embodiment, and therefore a redundant explanation has been omitted.

Figure 13:
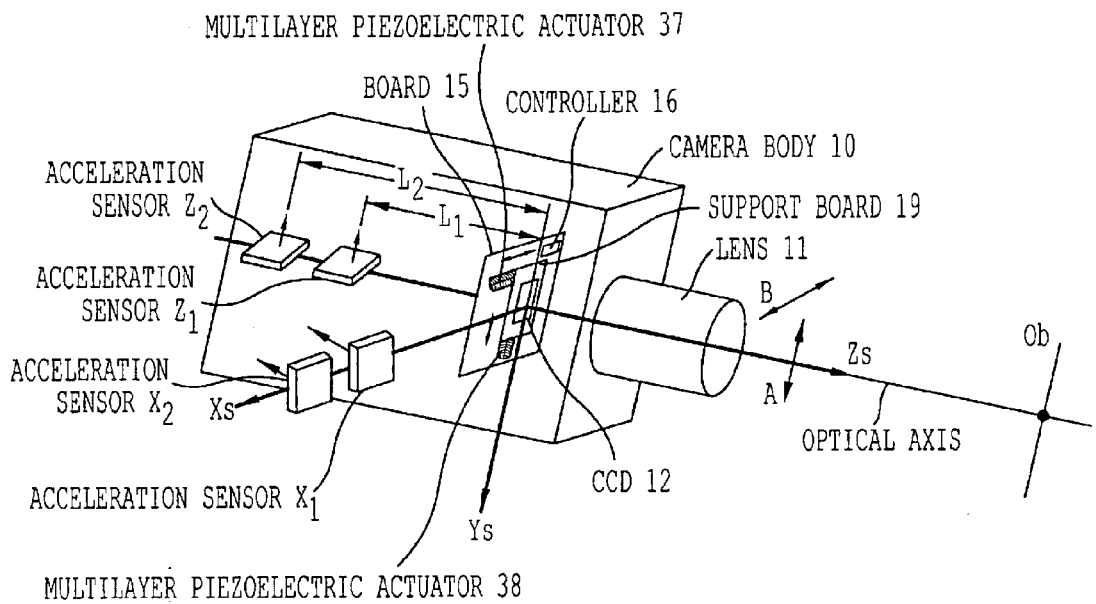
FIG. 13 is a perspective view of a camera according to a seventh embodiment of the present invention.

Now referring to FIG. 13, a seventh embodiment in which a pair of multilayer piezoelectric actuators 37, 38 is employed as actuators for driving the CCD 12 is described. The multilayer piezoelectric actuator 37 is a driver for the position in the Xs direction of the CCD 12. The other multilayer piezoelectric actuator 38 is a driver for the position in the Ys direction of the CCD 12. Both multilayer piezoelectric actuators 37, 38 are also attached with the support board 19 and adjust the position of the CCD 12 via the support board 19 under control of the controller 16. The other elements in FIG. 12 are the same as in the fifth embodiment, and therefore a redundant explanation except of the pairs of the multilayer piezoelectric actuators 37, 38 has been omitted.

Figure 14:
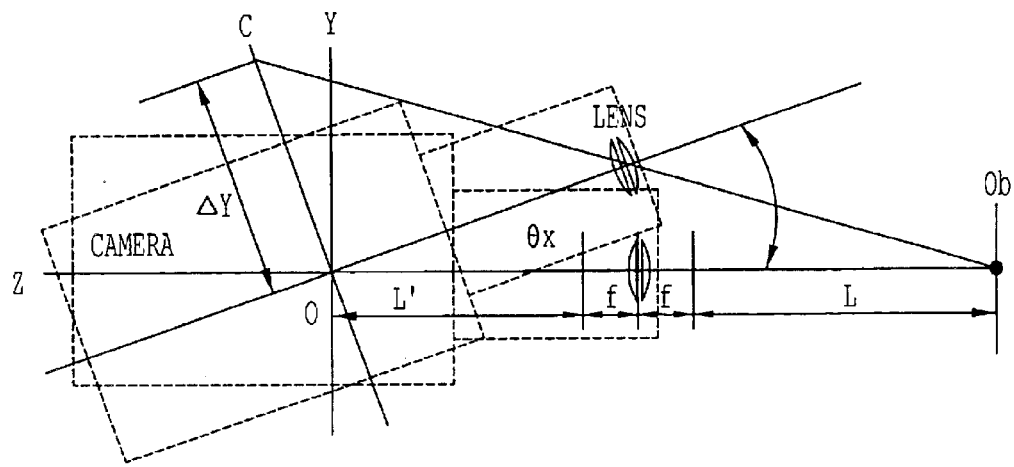
FIG. 14 is a cross-sectional view of a location of a camera body when a camera shakes around a Xs axis.

Now referring to FIG. 14, when a rotation θx around an axis in parallel with the Xs axis occurs as a result of the camera shaking, a focus point of the object moves out from an initial point 0 to a point C.

The amount of deviation between the initial point O and the point C is defined as ΔY.

The focus distance of the lens 11 is f. The distance L' is a distance between the focus point of the lens 11 and the image focusing point in the CCD 12. The distance L is a distance between the focus point of the lens 11 and the point of the object. Details of the explanation of the distances L, L' is described in "Point To Note and How to Use of Optical Device in Order to Use the Optelectronics Technique", by Tetsuo Sueda, Optelectronics, P36–37, the contents of this reference being incorporated herein by reference.

A scaling β is defined as β=f/L. And, L'=f²/L.

$$\Delta Y = (1+\beta)^2 \cdot \theta x \cdot f \quad (4)$$

The following equation is derived from the above equation (4) differentiated with respect to time t.

$$\frac{d(\Delta Y)}{dt} = (1 + \beta)^2 \cdot f \cdot \left( \frac{d\theta x}{dt} \right) \quad (5)$$

Similarly, the equation (6) is also derived from an equation differentiated with respect to time t when a rotation θy around an axis in parallel with the Ys axis occurs as a result of the camera shaking, a focus point of the object moves out from the initial point 0 to point C.

$$\frac{d(\Delta X)}{dt} = (1 + \beta)^2 \cdot f \cdot \left( \frac{d\theta y}{dt} \right) \quad (6)$$

The vales dθx/dt and dθy/dt can be derived from the integrated value of the dto/dt in the equations (1) and (2). Therefore, the values ΔX and ΔY are derived from the above equations.

The values ΔX and ΔY are values that the distance of the image focusing point in the CCD 12 should be corrected by the adjustment of the position of the CCD 12, or the optical system.

Figure 15:
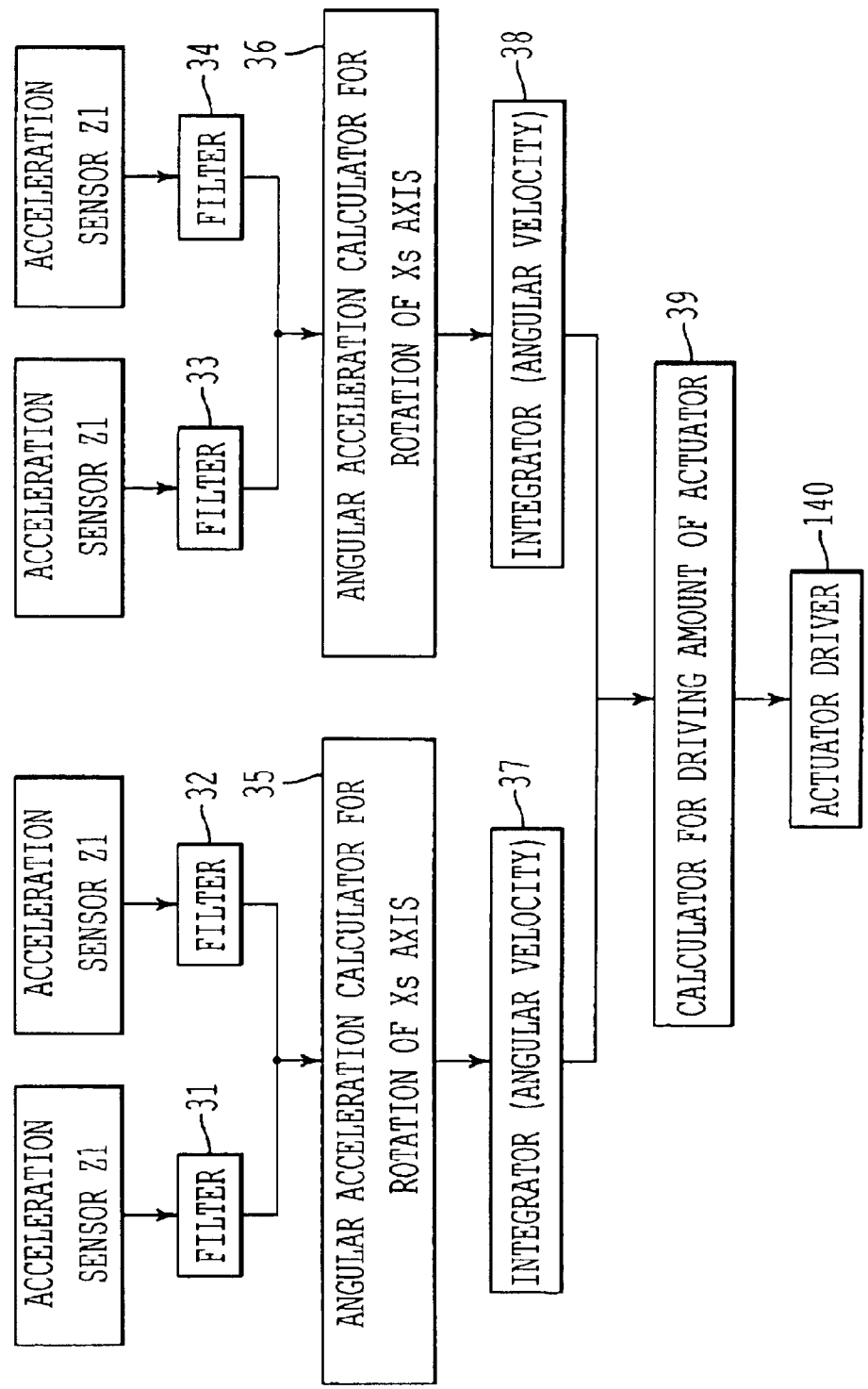
FIG. 15 is a block diagram for correcting a camera shaking according to the present invention.

Now referring to FIG. 15, the outputs of the pair of the acceleration sensors Z1, Z2 are input to filters 31, 32. The filters 31, 32 are made up of a low pass filter and a high pass filter. The high pass filter cuts a DC (direct current) component corresponding to the component of the gravity acceleration. The high pass filter is capable of reducing the offset noise at the position that the camera stands still. As another solution for reducing the offset noise at the position that the camera stands still, the system can detect the DC component of the camera shaking detector, and then subtract the DC component which is defined as the offset value from the detected signals. The low pass filter of filters 31, 32 cuts the component of the frequency more than 20 Hz in the output of the acceleration sensors.

A similar structure is employed for filters 33, 34 which receive outputs from the accelerator sensors X1, X2.

Figure 16A:
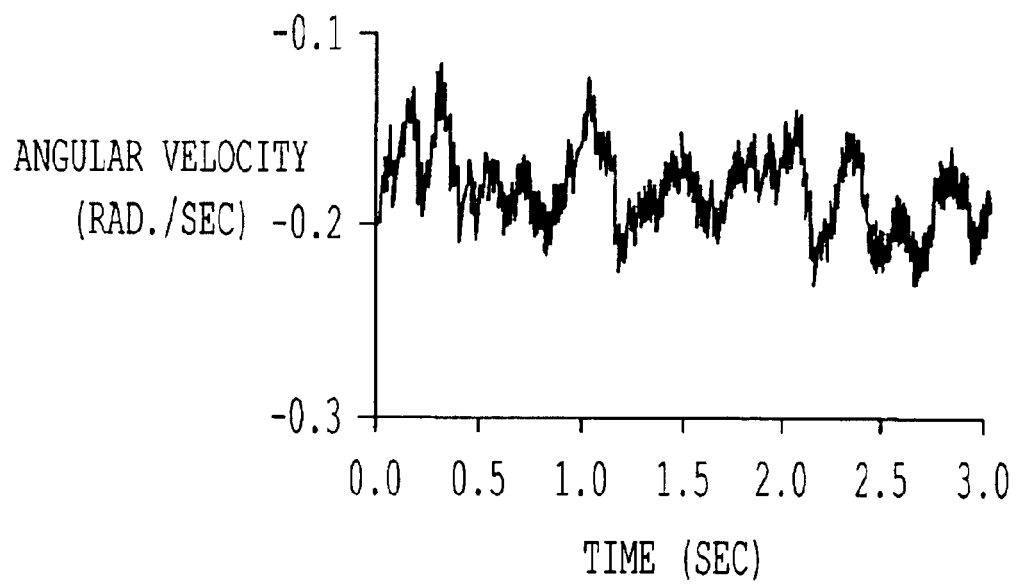
FIG. 16(a) is a spectrum of detected acceleration by acceleration sensors in the present invention.
Figure 16B:
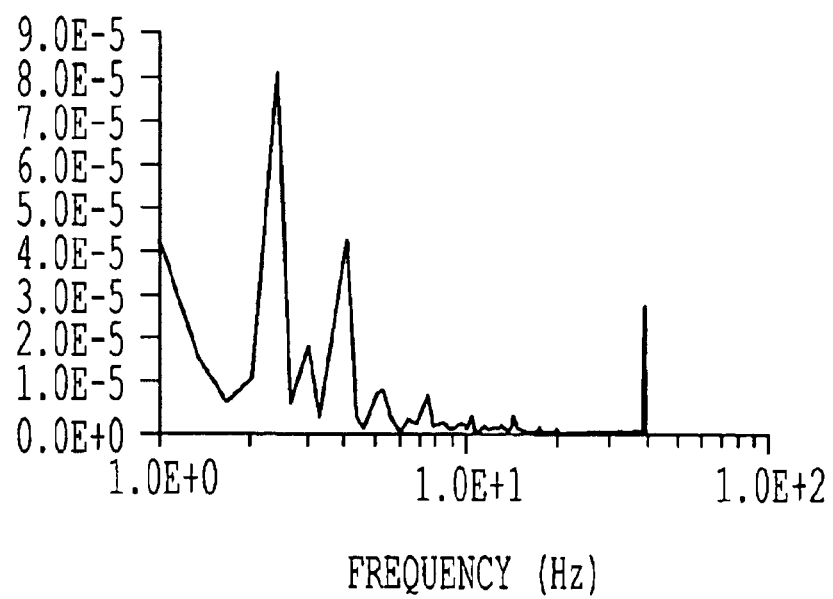
FIG. 16(b) is a spectrum of frequency when a camera shaking occurs.

Referring to FIGS. 16(*a*) and 16(*b*), when the camera body is made of aluminum, the general deviation of the angular velocity according to time is described. The power spectrum corresponding to the deviation of the angular velocity is described in FIG. 16(*b*). The time deviation of the power spectrum of the angular velocity in the camera shaking depends on less than 20 Hz according to FIG. 16(*b*).

Therefore, when a frequency component greater than 20 Hz of the power spectrum is cut by the low pass filter of filters 31, 32, the filter reduces noise or undesired signals, and finally gains the desired signal for the correction of the camera shaking.

Still referring to FIG. 15, the acceleration values reduced by the undesired signals by each filter 31, 32, 33, 34 are input to angular acceleration calculators 35 and 36. Angular acceleration calculators 35, 36 calculate the angular acceleration based upon the above equations. Each calculated angular acceleration is input in integrators 37 and 38. The integrators 37 and 38 integrate the angular acceleration into angular velocity based upon the above equations and further integrate the angular velocity into angles.

A correction calculator 39 inputs the calculated angular velocity and the angle, and calculates the amount of movement of the actuators. An actuator driver 140 drives actuators according to the above amount of movement.

Finally, the CCD 12 is adjusted to the proper positioning based on the driving of the actuators.

Figure 17:
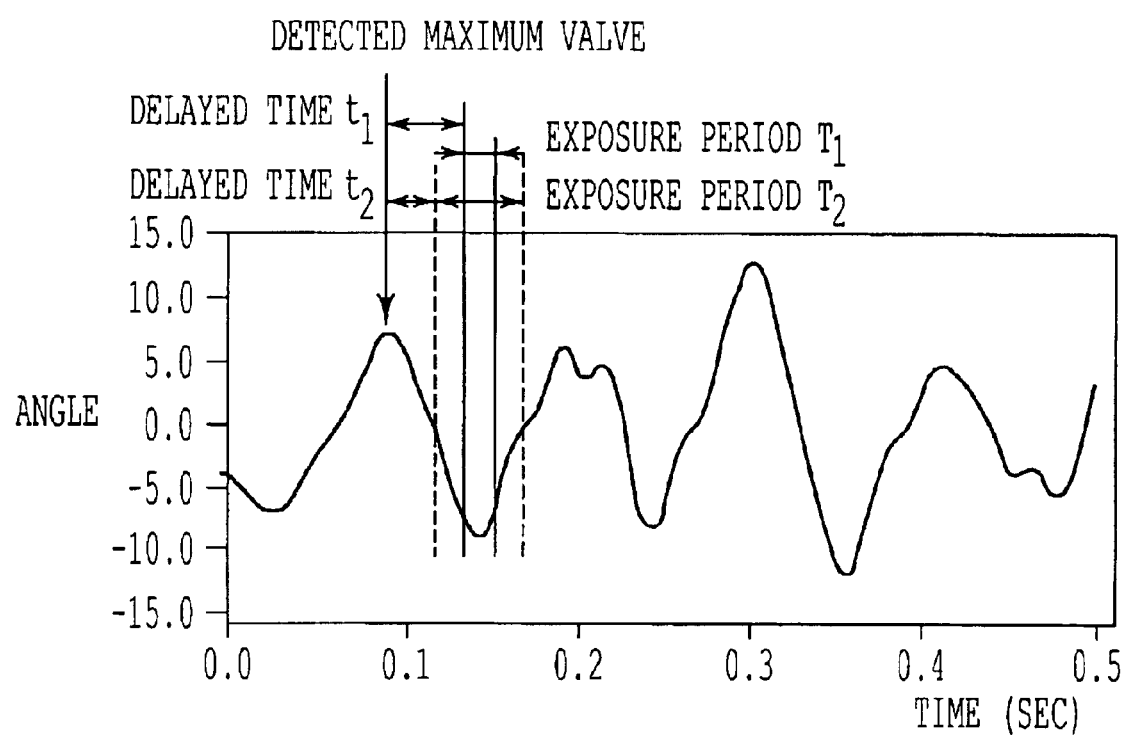
FIG. 17 is a relation between exposure periods and delayed times in the spectrum of detected angle by the angular velocity sensors.

Now referring to FIG. 17, It may be desired that the shooting process is carried out at the point where the maximum value or the minimum value is detected.

The delayed time from the former point detected for the maximum value is calculated according to the exposure period of which the center of the exposure time exists at the point where the next maximum value or the next minimum value of the camera shaking.

Therefore, as shown FIG. 7, when the exposure periods T1 and T2 are set to predetermined values, the delayed time t1, t2 are automatically determined.

Figure 18:
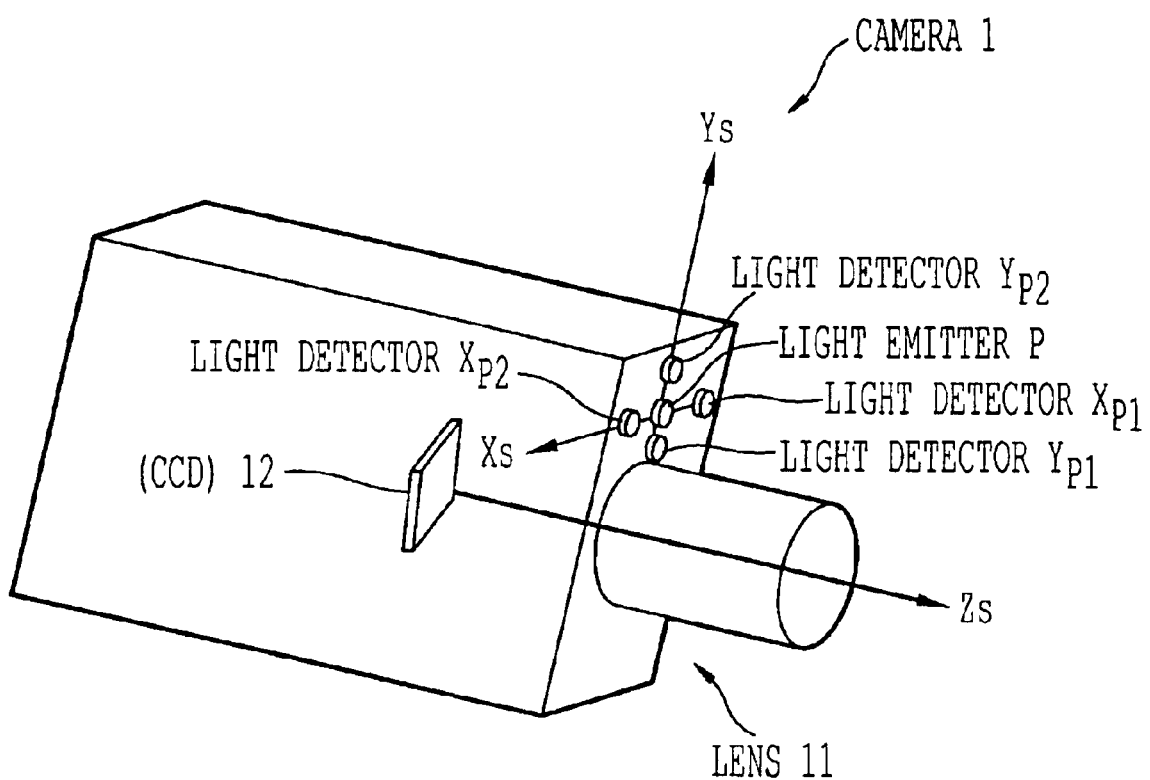
FIG. 18 is a perspective view of a camera according to a eighth embodiment of the present invention.

Now referring to FIG. 18, light detectors Xp1, Xp2, Yp1, Yp2 and a light emitter P are employed in the camera.

The light detectors Xp1, Xp2, Yp1, Yp2 and the light emitter P element are attached on the side of the photographic subject.

The light emitter emits the light to the photographic subject. The light detectors Xp1, Xp2, Yp1, Yp2 detect the reflected light from the subject and generates the current according to the amount of reflected light.

The camera system is capable of calculating the inclination from XY plane based on the above currents.

An inclination from Xs axis is defined as $\Delta\theta x$. An inclination from Ys axis is defined as $\Delta\theta y$.

$\Delta\theta x$ and $\Delta\theta y$ are calculated based on the above each currents Ixp1, Ixp2, Iyp1, Iyp2 by following equations; (7),(8)

$$\Delta\theta x = \frac{K_{XP1}}{\sqrt{I_{XP1}}} - \frac{K_{XP2}}{\sqrt{I_{XP2}}} \quad (7)$$

$$\Delta\theta y = \frac{K_{YP1}}{\sqrt{I_{YP1}}} - \frac{K_{YP2}}{\sqrt{I_{YP2}}} \quad (8)$$

The other elements in FIG. 18 are the same as in the above embodiment, and therefore a redundant explanation has been omitted.

The camera detects the periodical time of the output signals from the light detectors and the time corresponding to the maximum or minimum value.

The camera carries out the correction for the camera shaking and the shooting at the time when the latter maximum or minimum value generates.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts, as well as implementation in software, hardware, or a combination of both within the principles of the invention to the full extent indicated by the broad general meaning of the terms in which the appended claims are expressed.

The present document is based on Japanese priority document 10-353,791 filed in the Japanese Patent Office on Nov. 30, 1998, the entire contents of which are incorporated herein by reference.

Obviously, numerous additional modifications and variations of the present invention are possible in light Of the above teachings. It is therefore to be understood that within the scope of the appended claims, the present invention may be practiced otherwise than as specifically described herein.

What is claimed is:

1. A detecting system for detecting a deviation of a camera from shaking, comprising:
   a first shaking detector configured to detect a camera shaking and located on a first axis of a camera coordinate;
   a second shaking detector configured to detect a camera shaking and located on a second axis of the camera coordinated and configured to generate an output signal;
   a maximum or minimum value detector configured to detect points of maximum or minimum value in the output signal generated by the second shaking detector; and
   a correcting device configured to adjust an optical system of the camera corresponding to the first axis on which the first shaking detector is located, by only adjusting the optical system in the first axis when close to the detected points of maximum or minimum value, and to carry out a shooting at only the detected points of maximum or minimum value.

2. A detecting system for detecting a deviation of a camera from shaking, comprising:
   a first shaking detector configured to detect a camera shaking located on a first axis of a camera coordinate;
   a second shaking detector configured to detect a camera shaking located on a second axis of the camera coordinate and configured to generate an output signal;
   a maximum or minimum value detector configured to detect points of maximum or minimum value in the output signal generated by the second shaking detector; and a correcting device configured to adjust a position of an optical device of the camera toward the first axis on which the first shaking detector is located, by only adjusting the optical device in the first axis when close to the detected points of maximum or minimum value, and to carry out a shooting at only the detected points of maximum or minimum value.

3. The detecting system for detecting a deviation of a camera from shaking according to claim 2, wherein the correcting device is further configured to adjust a position of the optical device toward the first axis on which the first shaking detector is located after the points of maximum or minimum value are detected.

4. The detecting system for a deviation of a camera from shaking according to claim 2, wherein the first shaking detector and the second shaking detector are located on two axes of the camera coordinate perpendicular to each other.

5. The detecting system for detecting a deviation of a camera from shaking according to claim 2, wherein the first shaking detector and the second shaking detector are located on axes of the camera coordinate other than the optical axis.

6. The detecting system for detecting a deviation of a camera from shaking according to claim 1, wherein the maximum or minimum value of the camera shaking is detected from one of the first shaking detector or the second shaking detector.

7. The detecting system for detecting a deviation of a camera from shaking according to claim 1, wherein the shaking detectors comprise two pairs of acceleration sensors.

8. The detecting system for detecting a deviation of a camera from shaking according to claim 1, wherein the shaking detectors comprise two gyroscopes.

9. The detecting system for detecting a deviation of a camera from shaking according to claim 1, wherein one of the shaking detectors comprise a pair of acceleration sensors and the other shaking detector comprises a gyro sensor.

10. A detecting apparatus for detecting a deviation of a camera from shaking, comprising:
    first shaking detecting means for detecting a camera shaking and located on a first of a camera coordinate axis;
    second shaking detecting means for detecting a camera shaking and located on a second axis of the camera coordinate and configured to generate an output signal;
    maximum or minimum value detecting means for detecting points of maximum or minimum value in the output signal generated by the second shaking detecting means; and
    correcting means for adjusting an optical system of the camera corresponding to the first axis on which the first shaking detecting means is located, by only adjusting the optical system in the first axis when close to the detected points of maximum or minimum value, and for carrying out a shooting at only the detected points of maximum or minimum value.

11. A detecting apparatus for detecting a deviation of a camera from shaking, comprising:
    first shaking detecting means for detecting a camera shaking and located on a first of a camera coordinate axis;
    second shaking detecting means for detecting a camera shaking and located on a second axis of the camera coordinate and configured to generate an output signal;
    maximum or minimum value detecting means for detecting points of maximum or minimum value in the output signal generated by the second shaking detecting means; and
    correcting means for adjusting a position of an optical device of the camera toward the first axis on which the first shaking detecting means is located, by only adjusting the optical device in the first axis when close to the detected points of maximum or minimum value, and for carrying out a shooting at only the detected points of maximum or minimum value.

12. The detecting apparatus for detecting a deviation of a camera from shaking according to claim 9, wherein the correcting means further adjusts a position of the optical device toward the first axis on which the first shaking detecting means is located after the maximum or minimum value is detected.

13. The detecting apparatus for detecting a deviation of a camera from shaking according to claim 9, wherein the first shaking detecting means and the second shaking detecting means are located on two axes of the camera coordinate perpendicular to each other.

14. The detecting apparatus for detecting a deviation of a camera from shaking according to claim 9, wherein the first shaking detecting means and the second shaking detecting means are located on axes of the camera coordinate other than the optical axis.

15. The detecting apparatus for detecting a deviation of a camera from shaking according to claim 14, wherein the maximum or minimum value of the camera shaking is detected from one of the first shaking detecting means or the second shaking detecting means.

16. A method of detecting a deviation of a camera from shaking, comprising:
    detecting a camera shaking located on first and second axes of a camera coordinate and generating an output signal based on the detected camera shaking on the second axis;
    detecting points of maximum or minimum values in the output signal generated by the detecting; and
    adjusting a position of an optical device in the first axis, by only adjusting the optical device in the first axis when close to the detected points of maximum or minimum value, and carrying out a shooting at only the detected points of maximum or minimum value.

17. The method of detecting a deviation of a camera from shaking according to claim 16, further comprising:
    adjusting a position of the optical device toward the first axis after the maximum or minimum value is detected.

18. The method of detecting a deviation of a camera from shaking according to claim 16, further comprising:
    detecting the camera shaking on axes other than an optical axis.

19. The method of detecting a deviation of a camera from shaking according to claim 16, further comprising:
    detecting the maximum or minimum value from one of a first shaking detector or a second shaking detector.

20. A method of detecting a deviation of a camera from shaking, comprising:
    detecting a camera shaking located on first and second axes of a camera coordinate and generating an output signal based on the detected camera shaking on the second axis;
    detecting points of maximum or minimum value in the output signal generated by the detecting;
    adjusting a position of an optical device in the first axis, by only adjusting the optical device in the first axis when close to the detected points of maximum or minimum value, and carrying out a shooting at only the detected points of maximum or minimum value; and
    shifting a timing of an exposure to close by a timing located on the maximum or minimum value of the camera shaking based on a periodicity of the detected camera shaking.

* * * * *